United States Patent
Aschauer et al.

(10) Patent No.: US 11,667,002 B2
(45) Date of Patent: Jun. 6, 2023

(54) METHOD OF MONITORING A TOOL CLAMPING DEVICE

(71) Applicant: Ott-Jakob Spanntechnik GmbH, Lengenwang (DE)

(72) Inventors: Florian Aschauer, Schönau (DE); Florian Merz, Rieden (DE); Wolfgang Bechteler, Ebenhofen (DE); Josef Greif, Friesenried (DE)

(73) Assignee: Ott-Jakob Spanntechnik GmbH, Lengenwang (DE)

( * ) Notice: Subject to any disclaimer, the term of this patent is extended or adjusted under 35 U.S.C. 154(b) by 378 days.

(21) Appl. No.: 17/012,684

(22) Filed: Sep. 4, 2020

(65) Prior Publication Data

US 2021/0069845 A1 Mar. 11, 2021

(30) Foreign Application Priority Data

Sep. 5, 2019 (DE) .................... 10 2019 123 838.2

(51) Int. Cl.
*B23Q 17/00* (2006.01)
*B23Q 3/08* (2006.01)
(Continued)

(52) U.S. Cl.
CPC ........... *B23Q 17/005* (2013.01); *B23Q 3/082* (2013.01); *B23Q 11/0085* (2013.01);
(Continued)

(58) Field of Classification Search
CPC ...... B23Q 3/12; B23Q 17/002; B23Q 17/005; B23Q 17/2216; B23Q 2717/00
See application file for complete search history.

(56) References Cited

U.S. PATENT DOCUMENTS 4,628,586 A * 12/1986 Yoshimi ................ B23B 31/263
483/30
5,039,261 A * 8/1991 Takada .................. B23B 31/263
279/4.06
(Continued)

FOREIGN PATENT DOCUMENTS

DE 102015116347 A1 4/2016
DE 102016108407 A1 11/2017

OTHER PUBLICATIONS

Result of examination report for German Patent Application No. 10 2019 123 838.2 filed Sep. 5, 2019.

*Primary Examiner* — Christopher M Koehler
(74) *Attorney, Agent, or Firm* — Paul D. Bianco; Katharine Davis Wong; Fleit Intellectual Property Law

(57) ABSTRACT

A method of monitoring a tool clamping device mounted on a machine spindle, the clamping force of which tool clamping device is generated by a spring assembly which exerts a force in the direction of the clamping position on an actuating element actuating the clamping or the release of a tool or tool holder. In the method, the spring force and the displacement of the actuating element are continuously measured during the release and/or clamping of a tool or tool holder and recorded as functions of the time. These recorded functions are used to identify at least one parameter characteristic for the status of the tool clamping device. Based on the spring force and the displacement over time, a spring characteristic curve is plotted in the form of the spring force as a function of displacement, the analysis of which spring characteristic curve provides information about a number of characteristic parameters.

16 Claims, 4 Drawing Sheets

(51) Int. Cl.
*B23Q 11/00* (2006.01)
*B23Q 16/00* (2006.01)
*B23B 31/26* (2006.01)

(52) U.S. Cl.
CPC .......... *B23Q 16/001* (2013.01); *B23B 31/265* (2013.01); *B23Q 2703/04* (2013.01); *B23Q 2717/00* (2013.01); *Y10T 409/309464* (2015.01)

(56) References Cited

U.S. PATENT DOCUMENTS

| | | | |
|---|---|---|---|
| 5,741,981 A * | 4/1998 | Ling | G01L 1/042 73/862.541 |
| 9,796,025 B2 | 10/2017 | Hoki et al. | |
| 11,484,978 B2 * | 11/2022 | Möglich | B23Q 1/70 |
| 2006/0034670 A1 * | 2/2006 | Sugita | B23B 31/265 409/231 |
| 2008/0006101 A1 * | 1/2008 | Nogami | F16K 37/0083 702/105 |
| 2008/0193243 A1 * | 8/2008 | Mohr | B23B 31/265 409/233 |
| 2010/0119320 A1 * | 5/2010 | Inoue | B23B 31/261 409/233 |
| 2015/0013145 A1 * | 1/2015 | Fujiwara | B23B 31/101 29/559 |
| 2016/0096227 A1 * | 4/2016 | Hori | B23B 31/302 409/233 |
| 2018/0036854 A1 * | 2/2018 | Takano | G05B 19/401 |

* cited by examiner

METHOD OF MONITORING A TOOL CLAMPING DEVICE

FIELD OF THE DISCLOSURE

The present disclosure relates to a method of monitoring a tool clamping device mounted on a machine spindle.

BACKGROUND

The status of a clamping system is typically checked and recorded by means of a test rig prior to shipping to the customer. During this procedure, parameters such as a spring constant or coefficients of friction are determined. These parameters change to a certain extent when the clamping system is mounted and operated on a spindle. Reasons for deviations of these parameters include aging processes, wear and tear, or the failure of individual components, for example, a spring element, or if the system is incorrectly mounted and operated. Currently, it is possible to predict the lifespan of the clamping system in the mounted state by means of long-term tests. However, such tests are time-consuming and expensive; moreover, it is difficult to take different manufacturing tolerances into account. For specialty spindles which are only produced in low numbers, such an approach is economically not viable. As a result, errors are often detected only once the machine tool is in operation, which necessarily entails high costs.

To monitor a tool clamping device during operation, DE 10 2016 108 407 A1 proposes that the associated release mechanism be fitted with position sensors. However, using such sensors, it is only possible to check whether the clamping system is in the clamping position or in the release position and thus to monitor whether the tool clamping device correctly reacts to the control commands of the machine control unit of the machine tool, on the machine spindle on which the tool clamping device is mounted. However, using sensors of this type, it is not possible to detect a gradual deterioration of functionally relevant parameters of the tool clamping device.

DE 10 2015 116 347 A1 discloses a main spindle unit for a machine tool in which, in order to detect a reduction of the tool clamping device's clamping force that is exerted by a spring assembly, a measurement is taken during the clamping cycle on the hydraulic release mechanism of the tool clamping device, the result of which measurement is considered a measure of the clamping force. The measurement gives either a time interval, within which the hydraulic pressure of the release mechanism decreases by a predefined value during the clamping cycle, or the hydraulic pressure at which the hydraulic plunger of the release mechanism reaches a predefined position during the clamping cycle. Thus, in either case, only a single measured value of a time interval or of a hydraulic pressure is used to measure the clamping force of the tool clamping device.

SUMMARY

One aspect of the disclosure relates to a new method of monitoring a tool clamping device during operation on a machine spindle of a machine tool, which method allows the early detection of wear and tear and other malfunctions before the quality of the workpiece being machined is impaired.

Useful embodiments are also disclosed.

In an embodiment of a method of monitoring a tool clamping device according to the disclosure, the clamping force of which is generated by a spring assembly which exerts a force in the direction of the clamping position on an actuating element provided to clamp or release a tool or a tool holder, the spring force and the displacement of the actuating element are each continuously measured and recorded as functions of the time during which a tool or tool holder is being released or clamped, and based on these recorded functions, one can determine at least one parameter characteristic for the status of the tool clamping device, with a spring characteristic curve in the form of the spring force as a function of displacement being determined from the spring force and the displacement as functions of time.

The periodic measurement of the spring force and the displacement of the actuating element during continuous operation allows the functional capability of the tool clamping device to be continuously monitored. Based on these data, it is possible to determine various parameters which provide information on a number of characteristics about the status of a tool clamping device. To perform the measurements required for monitoring, the operation of the machine spindle need not be interrupted. The spring characteristic curve determined according to the present invention is a principal component of the description of the functions of a spring force-operated tool clamping device. This curve includes several characteristic parameters which characterize the functional status of such a tool clamping device.

The easiest method of analyzing a spring characteristic curve is to determine the spring force acting along a predefined displacement as a characteristic parameter. A value deviating excessively from a construction-related expected value is considered to be the first sign of a defect.

In addition, a characteristic parameter can also be a spring constant which is calculated based on the spring force as a function of the displacement within a predefined stretch of the displacement, wherein the predefined stretch of the displacement is the stretch in which the spring characteristic curve extends in an approximately linear line. Again, a design-related expected value is known for the spring constant. An excessively high deviation from this value also suggests a defect. Instead of a spring constant, it is also possible to calculate a correlation factor which is a measure for the similarity between the spring force as a function of the displacement and a predefined function. In this case, the predefined function is a design-related expected characteristic curve which can also be nonlinear.

When a complete release and clamping cycle is performed, the energy lost converted into heat or the quotient of the energy lost converted into heat and the total work done can be calculated for use as a characteristic parameter. It is obviously desirable that energy loss be as low as possible and that the quotient of this energy loss and the total work done during the release and clamping cycle be as low as possible and that an excessively high value of energy loss or of said quotient also suggests a defect or at least wear and tear on the tool clamping device.

Another characteristic parameter can be based on the deviation of the spring force as a function of the displacement from a linear shape within an initial predefined stretch of the displacement in which deviation from a linear shape is desirably as low as possible. Deviations from the linearity along the characteristic curve of force vs. displacement, particularly oscillations, indicate an irregular movement in the deflection of the spring assembly, which may indicate wear and tear or a partial failure of the lubricant on the bearing of the spring assembly.

Further, during a release cycle, the deviation of the spring force as a function of the displacement from a linear shape within a second predefined stretch of displacement, in which a deviation of a predefined degree is a sign that the tool or tool holder is being correctly ejected from the tool clamping device, can serve as a characteristic parameter. The correct ejection of the tool or tool holder in a specific phase of the release cycle is of crucial importance for the functional capability of a tool clamping device. According to the present invention, it is possible to also monitor the performance of this function by specifically analyzing a defined stretch of the spring characteristic curve.

In addition, as a characteristic parameter, at least one time interval between two times associated with predetermined changes in the shape of the spring characteristic curve can also be determined This is possible in that each point of the spring characteristic curve has been dedicated to a specific point in time within a release and clamping cycle. Maintaining specific time-related conditions is an essential performance feature of a tool clamping device since the length of time of a release and clamping cycle is factored into the length of time of a tool change. Exceeding acceptable time intervals also suggests a tool clamping device defect.

Time intervals of primary interest in this particular context are the time between the electronic initiation of a movement that leads to the release of the tool or tool holder and the beginning of this movement and/or the time between the beginning of a movement that leads to the release of the tool or tool holder and an application of force to the spring assembly and/or the time between an application of force to the spring assembly and the ejection of the tool or tool holder. The sum of these three time intervals is the total time elapsed until the tool or tool holder is actually ejected.

Yet another characteristic parameter is the maximum force occurring at the end of a release cycle, which force occurs when the displacement of the actuating element is limited by a mechanical stop. This force determines the maximum pressure that the hydraulic unit needed for operating the tool clamping device must exert to be able to deflect the actuating element up to the stop mentioned.

If a characteristic parameter deviates from a reference value by exceeding it by a predetermined value or if the deviation indicates the presence of a defect by any other means, preferably a message is sent to an electronic control device which controls the operation of the machine spindle and/or an optical or acoustic warning signal to the operating personnel is emitted by a display unit. This prevents the machine spindle from continuing its operation and the workpiece from being machined with faulty or unacceptably poor quality.

The reference value can be a fixed predefined value, or a value of the characteristic parameter determined in a previous release and clamping cycle, which was stored in a data storage unit of a monitoring device provided for implementing the method. It is understood that this reference value must have been evaluated as correct in the evaluation of the data collected in the previous release and clamping cycle, for which a fixed predetermined reference value had to be used at least in the first release and clamping cycle monitored after the tool clamping device was put into operation. In principle, however, it is possible to always use a fixed predefined reference value.

According to a favorable embodiment of the method disclosed by this invention, values of a characteristic parameter collected are stored in a data storage unit of a monitoring device provided for implanting the method, and based on the values stored, rates of change are calculated and used to predict the future development of the characteristic parameter over time. For example, the development of the spring constant can be monitored, and if a slow reduction at the same constant rate is noticed, the point in time the spring constant will presumably reach the lower threshold of its acceptable tolerance range can be predicted. Thus, the invention makes it possible to predict the time at which a characteristic status parameter of the tool clamping device will leave its acceptable tolerance range and thus allows the timely planning and preparation of a necessary replacement of the tool clamping device. This method of analysis can, of course, also be applied to parameters other than the spring constant.

The spring force is preferably measured indirectly in that a hydraulic force—which counteracts the spring force and which is exerted on a plunger of a hydraulic release mechanism, which plunger, during the release operation, exerts a force on the actuating element in the direction of the release position—is calculated by measuring the hydraulic fluid pressure and the surface area of the plunger to which this pressure is applied. Thus, to measure the force, it is not necessary to mount a strain sensor on an element on which the spring force is acting since the elements involved are able to move and especially since the actuating element, which actuates the clamping and release movement, in the form of a drawbar rotates with the machine spindle when this spindle is in operation. As a result, the transmission of a sensor signal from the tool clamping device to the monitoring unit implementing the method according to the invention is markedly simplified.

Preferably, the hydraulic fluid pressure acting on the plunger is measured on each axial side of the plunger, and from this pressure and the surface area of the respective side of the plunger, on which this pressure acts, a force acting from this side on the plunger is calculated, and by calculating the difference between these two forces, one may calculate the resulting hydraulic force on the plunger, which counteracts the spring force. By calculating this difference, the hydraulic force actually acting on the plunger can be determined with high accuracy.

BRIEF DESCRIPTION OF THE DRAWINGS

A practical example of the invention will be described below with reference to the drawings. The drawings show FIG. 1 a longitudinal section through a clamping device in two different work positions, FIG. 2 a simplified representation of the method according to the present invention in the form of a program flowchart, FIG. 3 an example of a shape of the spring characteristic curve of a tool clamping device after a completed release and clamping cycle, FIG. 4 a second example of a shape of the spring characteristic curve of a tool clamping device after a completed release and clamping cycle, FIG. 5 an example of a shape of the spring characteristic curve of a tool clamping device during a release cycle,

DETAILED DESCRIPTION

Figure 1:
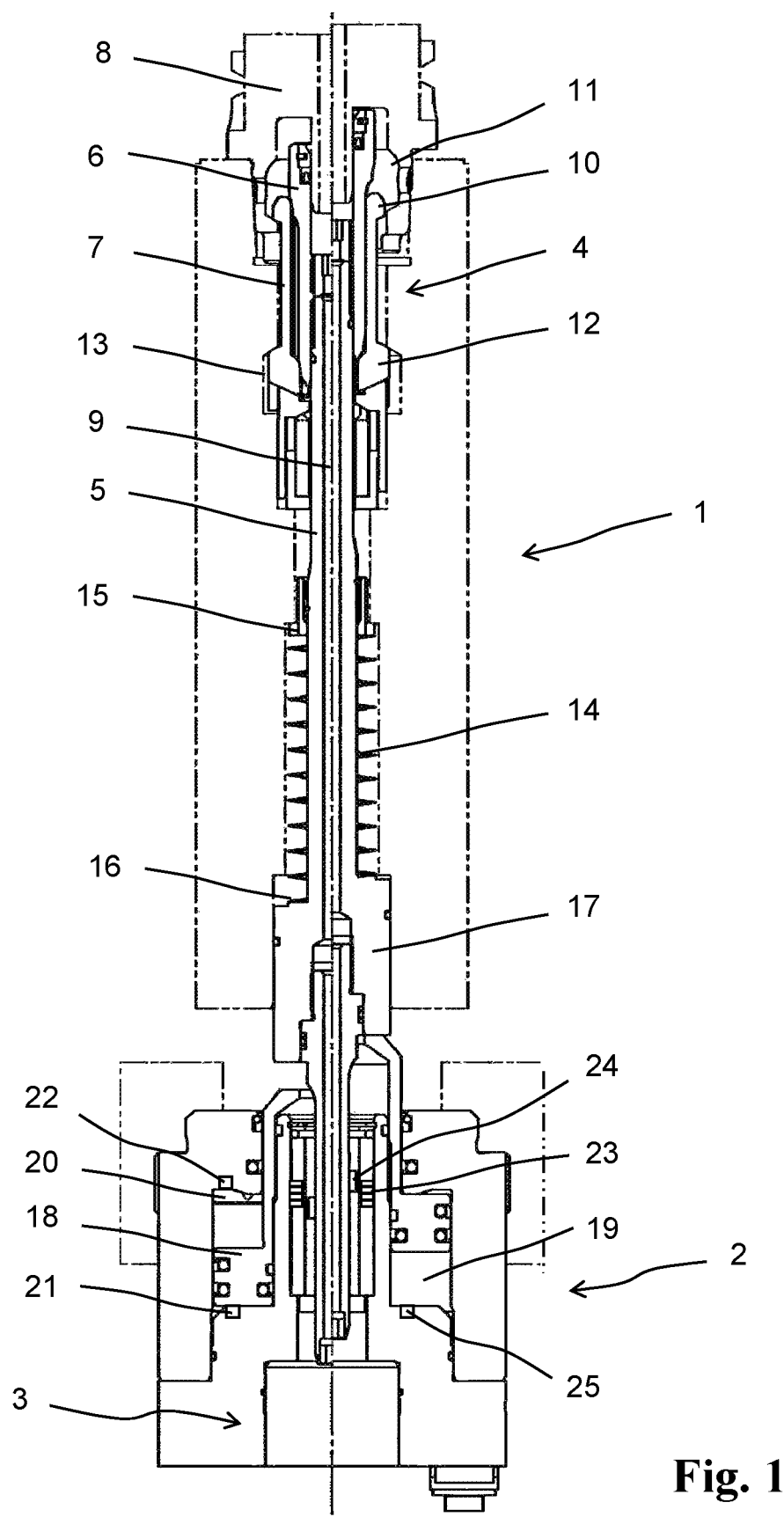

FIG. 1 shows a tool clamping device 1 configured for mounting on a rotating machine spindle of a machine tool, said tool clamping device having a release mechanism 2 and a rotary feedthrough 3 for supplying a lubricating coolant or another working fluid. The tool clamping device 1 comprises a clamping set 4 which can be actuated by means of an axially movable drawbar 5. The drawbar forms the actuating element for releasing or clamping the clamping set 4. In the embodiment illustrated, the clamping set 4 comprises clamping cone 6 and several collet elements 7 disposed about the clamping cone 6 for holding a tool or a tool holder 8. The left half of FIG. 1 shows the tool clamping device 1 in the clamping position in which the tool holder 8 is clamped to the device, the right half shows the tool clamping device in the release position in which the tool holder 8 is removed from the device and therefore can be replaced.

The clamping cone 6 of the clamping set 4 is mounted on the anterior end of the drawbar 5 facing the tool holder 8. By moving the clamping cone 6 axially over the drawbar 5, the collet elements 7 can be moved to clamp or release the tool receiver 8. However, the clamping set 4, here configured as a collet, can also be configured, e.g., to have radially movable balls, or in any other way. In the embodiment shown, the drawbar 5 has a throughbore 9 for supplying a working and/or cleaning fluid via the rotary feedthrough 3 to the tool holder 8.

The outer ends 10 of the collet elements 7 of the clamping set 4 engage in an annular groove 11 of the tool holder 8. The inner ends 12 of the collet elements 7 are disposed in a sheath-shaped spacer 13. The drawbar 5 is preloaded in a retracted clamping position by means of a spring assembly 14 concentrically arranged about this rod. The spring assembly 14, which in the embodiment shown is a disk spring assembly, is braced on one side against a sleeve-shaped abutment element 15 which is supported inside the machine spindle and on the other side against an annular surface 16 of a wider posterior part 17 of the drawbar 5.

Release mechanism 2 is disposed on the posterior end of the drawbar 5 and facing away from the tool holder 8 This release mechanism houses a plunger 18 which is guided inside a casing and moved by a pressure fluid, by means of which plunger the drawbar 5 can be pushed against the force of the spring assembly 14 into a release position. If the drawbar 5 is pushed by the plunger 18 of the release mechanism 2 against the force of the spring assembly 14 from its release position shown in the right half of FIG. 1 in the direction of the tool holder 8, which is accomplished by supplying hydraulic fluid to the release mechanism 2, the collet elements 7 are radially moved inwardly and release the tool holder 8 for removal from the machine spindle. If, on the other hand, the plunger 18 is retracted by suitably actuating the release mechanism 2, the drawbar 5 is also retracted by the force of the spring assembly 14, which causes the collet elements 7 to be radially pushed outwardly by the clamping cone 6 and to retract and clamp the tool holder 8 into the machine spindle. This position can be seen in the left half of FIG. 1. A lubricating coolant or another working fluid can be fed through the rotary feedthrough 3 into the drawbar 5 which rotates during the machining operation and be supplied to the tool holder 8 by way of the throughbore 9.

The plunger 18 divides a hollow space, which is filled with hydraulic fluid, inside the release mechanism 2 into a posterior chamber 19 and an anterior chamber 20. During the release cycle, pressure is applied to the posterior chamber 19 by means of an external hydraulic unit (not shown in FIG. 1) which is connected to the release mechanism 2 by means of hydraulic lines, while the anterior chamber 20 is depressurized. As a result, the plunger 18 moves in the forward direction and thereby displaces the hydraulic fluid from the anterior chamber 20. Once the anterior end has struck the face of the posterior part 17 of the drawbar 5, the plunger moves the drawbar under compression of the spring assembly 14 towards the front until the collet clamps 7 release the tool holder 8.

During the clamping cycle, the anterior chamber 20 is pressurized by means of the hydraulic unit while the posterior chamber 19 is depressurized. Driven by the combination of the hydraulic force and the force of the spring assembly 14, the plunger 18 moves toward the rear, thereby displacing the hydraulic fluid from the posterior chamber 19. The pressure in the anterior chamber 20 is controlled in such a way that the hydraulic force is markedly lower than the force of the spring assembly 14 so that the movement is driven predominantly by the latter. After the plunger 18 has disengaged itself from the face of the posterior part 17 of the drawbar 5, the spring assembly 14 no longer plays a part in moving the plunger 18; instead, from then on, the plunger is moved solely by the pressure of the hydraulic fluid in the anterior chamber 20. This part of the motion sequence of the clamping cycle serves to create an axial distance between the surfaces of the drawbar 5 and the plunger 18, which surfaces come in contact with each other during the release cycle, since the drawbar 5 rotates while a workpiece is being machined while the plunger 18 is stationary.

According to the present invention, a first pressure sensor 21 for measuring the pressure of the hydraulic fluid in the posterior chamber 19 is disposed on the posterior chamber 19 of the hollow space, and a second pressure sensor 22 for measuring the pressure of the hydraulic fluid in the anterior chamber 20 is disposed on the anterior chamber 20 of the hollow space. The hydraulic force exerted on the plunger 18 can be calculated based on these pressures and the known areas of the plunger 18, to which these pressures are applied. In this context, it should be noted that the areas of the plunger 18, which axially bound the two chambers 19 and 20 toward the front and toward the rear, are not identical, which can be seen in FIG. 1.

The pressure sensors 21 and 22 can, for example, be piezoresistive or capacitive pressure sensors known in the art.

Although, both in the release cycle and in the clamping cycle, pressure is externally applied only to one of the two chambers 19 or 20 while the respective other chamber is depressurized, dynamic pressure develops because of the displacement of the hydraulic fluid from the respective depressurized chamber as a result of the movement of the plunger 18 in this chamber, which dynamic pressure has the effect that a force directed counter to the respective direction of movement of the plunger 18 is acting on the plunger 18. As a result, the resulting force on the plunger 18, which is directed in the direction of the movement of the plunger, is slightly reduced.

According to the present invention, a position sensor 23 for detecting the axial position of the drawbar 5 is disposed inside the release mechanism 2. This sensor is preferably a no-contact sensor. Examples of suitable sensors are inductive sensors in the form of a differential transformer (LVDT) or a differential throttle, the coils of which are wrapped around the drawbar 5. In the axial region of the position sensor 23, the cross section and/or the magnetic permeability of the drawbar vary/varies. For example, in this region, the drawbar 5 may have a ring 24 attached to it, which ring can consist of a material of high magnetic permeability. The axial position of such a segment with a different cross section and/or different permeability can be measured by means of a differential transformer (LVDT) or differential throttle using a method known in the art.

Another possible type of no-contact position sensor 23 is a radial inductive distance sensor in conjunction with a ring made of a ferromagnetic material which is mounted on the drawbar 5 and the outer surface of which is chamfered in the axial direction. Based on the measured change of the radial distance between this ring and the distance sensor when the drawbar is axially moved, it is possible to determine the axial position of the drawbar 5. Suitable inductive distance sensors are known in the art.

Yet another possible type of no-contact position sensor 23 is a capacitive sensor on which a segment of the drawbar 5 with a different cross section forms a shared electrode of two series-connected capacitors. In this type of configuration, the overall capacitance depends on the axial position of said segment of the drawbar 5 relative to two axially sequential outer electrodes which surround the drawbar 5. Capacitive position sensors of this type are known as well and therefore do not require a detailed explanation.

Disposed on the rear wall of the posterior chamber 19 is a plunger position sensor 25 which serves to detect the posterior end position of the plunger 18. Sampling the signal of the plunger position sensor 25 during operation, which sensor can be, for example, an inductive, capacitive or magnetic proximity switch, can ensure that the plunger 18 and the face of the posterior part 17 of the drawbar 5 are no longer in contact with each other before the machine spindle, and along with it the drawbar 5, is set in rotation.

The above-described pressure- and position sensors 21 to 23 and possibly 25 serve to implement the method according to the present invention by means of an electronic monitoring device. The hardware of this monitoring device comprises an electronic signal processing unit for the processing and analog-digital conversion of the sensor signals, a microcomputer for the program-controlled analysis of the sensor signals and a nonvolatile data storage unit for recording measurement and analysis results. Via a suitable interface, the microcomputer is connected to the machine control unit of the machine tool, on the machine spindle of which the tool clamping device 1 is mounted, and can comprise a display unit for displaying information for the personnel operating the machine tool. Thus, the hardware monitoring device consists of standard components of analog and digital electronic systems and therefore does not require a detailed explanation.

Figure 2:
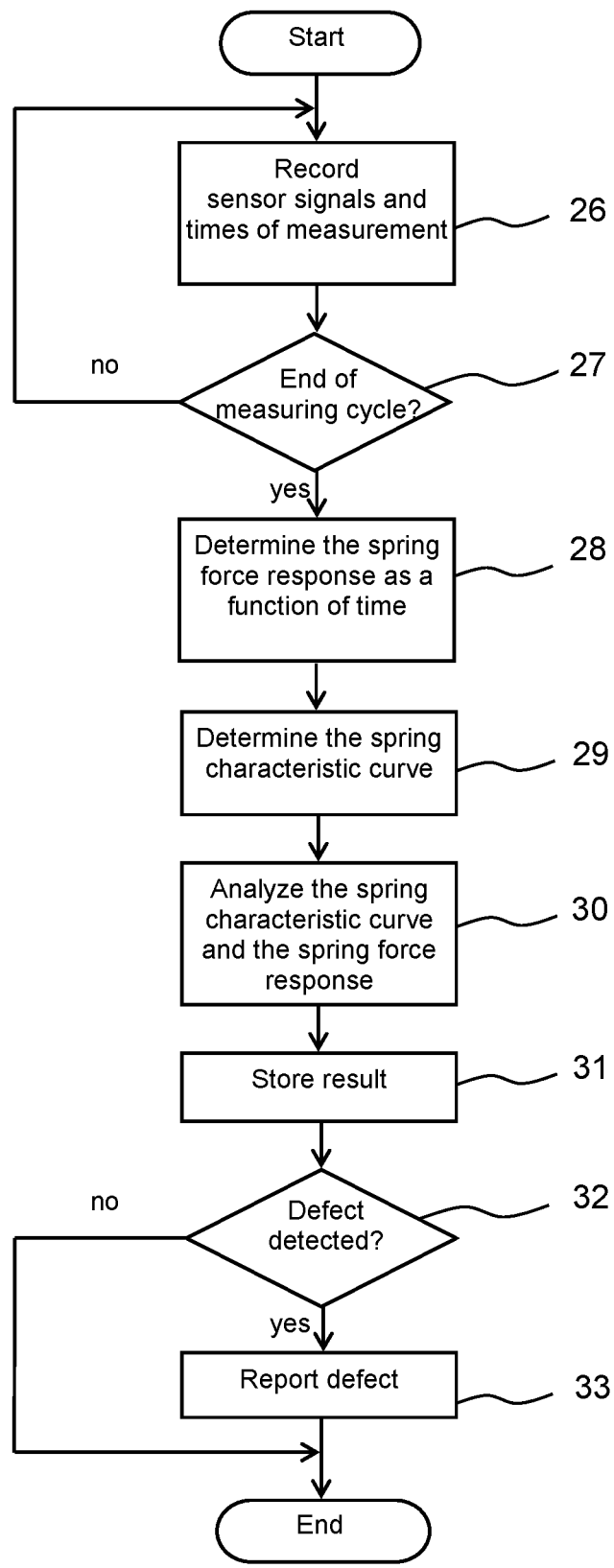

FIG. 2 shows the basic sequence of the method according to the present invention in the form of a program flowchart. The start of a release cycle forms the start of a cycle of the method. This start can be directly signaled to the monitoring unit either by the control unit which controls the machine spindle, or it can be triggered by a sensor signal, for example, by an increase in the pressure measured by the pressure sensor 21 in the posterior chamber 19, which is initiated by a movement of the plunger 18. Instead, however, it could also be triggered by the signal of the plunger position sensor 25 which monitors the posterior end position of the plunger 18. The reason is that a departure of the plunger 18 from its posterior end position is an explicit indication for the start of a release cycle.

Once the cycle has started, the sensor signals of the pressure sensors 21 and 22 and the position sensors 23 and the times, at which these signals are acquired, are recorded in step 26.

The latter is made possible by the fact that the monitoring device which carries out the method according to the present invention, among other things, has a real-time clock. The objective of step 26 is to store the signals of said sensors 21 to 23 as functions of time. This can be accomplished in that a time-controlled acquisition of the sensor signals takes place at fixed time intervals after the start and that for each measured value acquired for a sensor signal, the time at which it was acquired is stored as well. The measured values of the sensor signals are continuously recorded at specific time intervals until it is determined in step 27 that the end of a measuring cycle has been reached.

The end of a measuring cycle generally coincides with the end of a completed release and clamping cycle of the tool clamping device 1. This end is signaled by the fact that the position sensor 23 indicates that the drawbar 5 has returned to its posterior end position in which the tool holder 8 is clamped by means of collet clamps 7. However, in a simplified version of the method, the end of a measuring cycle could also be defined simply as the end of a release cycle, which is signaled by the fact that the drawbar 5 has reached its anterior end position in which the tool holder 8 has been released from the collet clamps 7.

As an alternative to recording each individual time at which sensor signals are acquired, it would also be possible to record the time following the start of the measuring cycle, and the sensor signals could subsequently be acquired continuously, and between the sensors in alternating cycles, until the end of a measuring cycle is reached. In this case, it would only be necessary to again acquire the time at the end of the measuring cycle and based on the difference between the two times acquired and the number of measured values of the sensor signals, it would be possible, for each individual value measured, to calculate a time, at which the value was recorded, and to dedicate this time to the value measured and store it, provided that the continuous acquisition of the sensor signals follows a regular time schedule, especially with uniform time intervals between the acquisitions of the individual values to be measured.

An essential aspect of the method according to the present invention is that the measured values acquired by the sensors 21 to 23 after the end of a measuring cycle, i.e., before the method proceeds with step 28, are stored as a function of time, i.e., that for each sensor signal, a number of measured values are stored, to each of which a time is dedicated at which the value was acquired. This time need not be an absolute time, but instead it can also be a time difference relative to a starting time at which the measuring cycle started.

Next, in step 28, based on the measured values of the signals of the pressure sensors 21 and 22 and the known surfaces of the front and rear face of the plunger 18, the resulting hydraulic force exerted on the plunger 18 is calculated as a function of time, the corresponding reaction force at the contact of the plunger 18 with the drawbar 5, is the force of the spring assembly 14. In step 29, based on this spring force curve as a function of time and the stored position of the drawbar 5 as a function of time, the spring characteristic curve of the spring assembly 14 in the form of the resulting hydraulic force exerted on the plunger 18 is subsequently determined as a function of the displacement of the drawbar 5. This approach is based on the assumption that the frictional forces, which unavoidably occur in the motion sequence of a release and clamping cycle in the entire system, are negligible relative to the spring force of the spring assembly 14 and the resulting hydraulic force of the plunger 18.

Step 30 defines, several characteristic parameters based on the spring characteristic curve which provide information about the current status of the tool clamping device 1; this will be explained below with reference to FIGS. 3 to 5. In step 31, these parameters are stored to record their development over time.

In step 32, the parameters are subsequently checked to determine whether they identify an already existing or an incipient defect on the tool clamping device 1. If this is the case, an appropriate message is generated or issued in step 33. Such a message can be addressed to the machine control unit of the machine tool, on the machine spindle where the tool clamping device 1 is mounted. As an alternative or in addition thereto, however, an optical and/or acoustic warning signal for the personnel operating the machine can also be output on a display unit. After step 32 or 33, one cycle of the method according to the present invention is completed.

Figure 3:
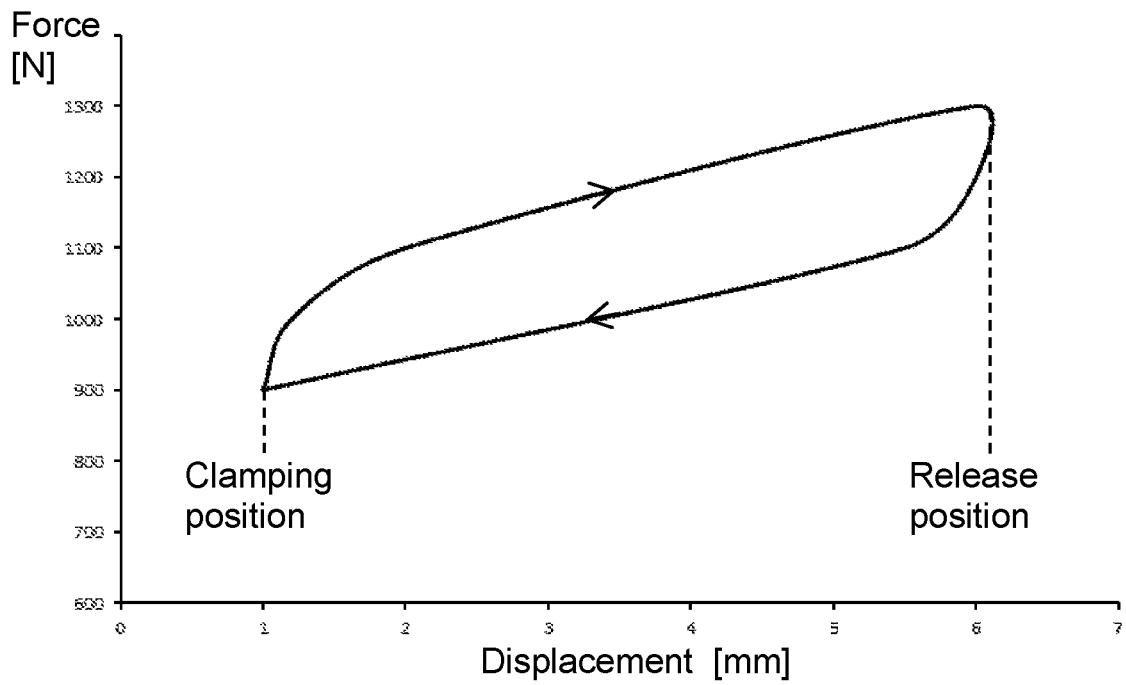
Figure 4:
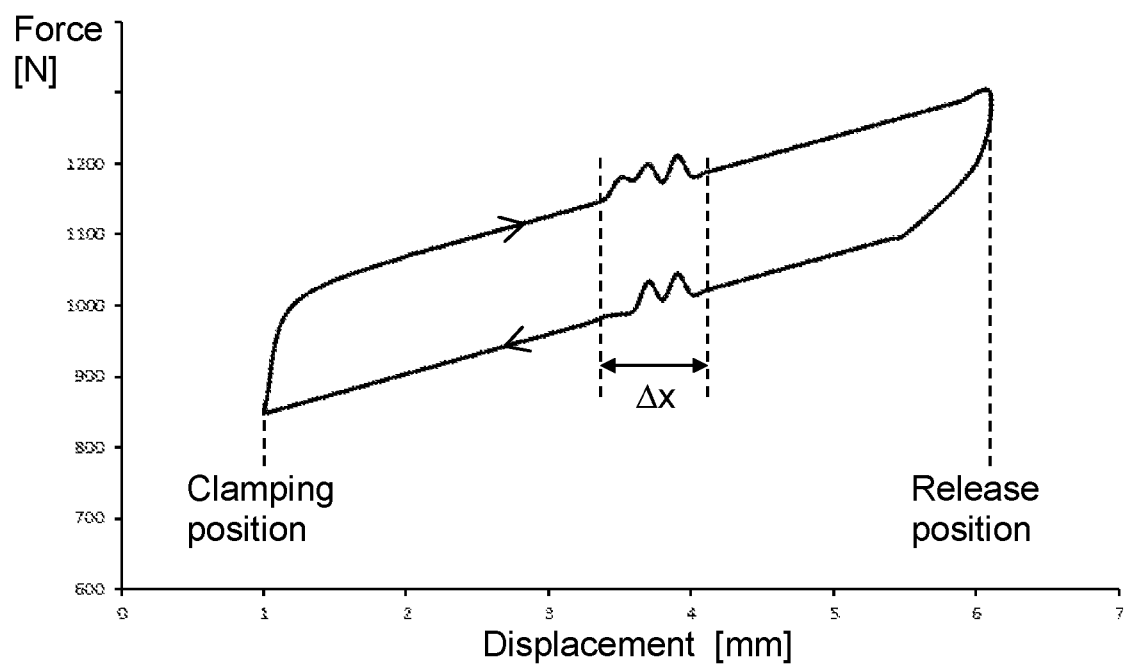

FIG. 3 shows the measured force as a function of the displacement of a typical spring characteristic curve of the type such as is determined in step 29. In this context, it should be noted that the spring characteristic curve shown in FIG. 3 was plotted on a test rig on which the spring assembly 14 on a drawbar 5, starting at a defined starting point, was compressed by a specific length of the displacement and was subsequently relieved again up to the starting point. This is the reason why the displacement and the force in FIG. 3 do not start at zero, with the reminder that even when mounted, the spring assembly 14 is invariably prestressed to a certain degree. From the standpoint of quality, along the length of the displacement, along which the spring assembly 14 was compressed, a spring characteristic curve plotted by means of a tool clamping device mounted on a machine spindle as disclosed by the present invention would therefore have the same shape as that shown in FIG. 3. In a graph matching FIG. 3, the spring characteristic curve might simply be shifted in the horizontal and vertical direction.

A first parameter that can be used to check whether the tool clamping device 1 is correctly functioning when in operation is the value of the force measured along a specific predefined displacement. An excessively high deviation from an expected setpoint value alone is a sign of a malfunction of the spring assembly 14 of the tool clamping device 1. This check does not require complex computations and can therefore be performed very quickly. If the result is negative, the tool clamping device 1 should not be operated since correct machining of the workpiece cannot be expected.

As illustrated in FIG. 3, after a nonlinear rise at the beginning of the movement, the upper branch of the spring characteristic curve, which during the release cycle proceeds upwardly in the direction of the arrow shown, extends as much as possible in a linear line. For the linear stretch of the spring characteristic curve which has an extension that is known in advance, it is easy to calculate the slope of the associated branch of the characteristic curve, which slope constitutes a first spring constant of the spring assembly 14. This first spring constant is another parameter that can be used to assess the status of the tool clamping device 1 in step 30. When the die tool clamping device 1 is intact, this spring constant must be within a predefined tolerance range around a predefined setpoint value. An excessively high deviation from the setpoint value is a sign of a malfunction of the spring assembly 14. An excessively low value of the spring constant is a sign of material fatigue or deformation of the spring assembly 14 after multiple load changes.

As an alternative to calculating the slope, it might also be possible to calculate a correlation factor which represents a measure for the similarity of the characteristic curve to a predefined reference characteristic curve. This type of analysis can be applied not only to a linear spring characteristic curve but also to a spring assembly 14 with a design-related nonlinear shape of the spring characteristic curve within the region of interest. Correlation methods for a similarity analysis of two function are known in the art.

As FIG. 3 shows, after a nonlinear drop of the force at the beginning of the clamping cycle, the lower branch of the spring characteristic curve, which during the clamping cycle proceeds downwardly in the direction of the arrow shown, also extends as much as possible in a linear line. For said linear stretch, it is also easy to calculate the slope of the corresponding branch of the characteristic curve, which slope constitutes a second spring constant of the spring assembly 14. As a close look at FIG. 3 indicates, the two spring constants are generally not identical to each other. The second spring constant also constitutes a status parameter of the tool clamping device 1 and is analyzed by means of the same criteria as the first spring characteristic curve.

The area enclosed by the spring characteristic curve in FIG. 3 constitutes the lost energy that must be expended to override frictional forces within a complete release and clamping cycle. This energy is an additional parameter which characterizes the status of the tool clamping device 1. The objective of the design is to construct the clamping system so that the energy loss is kept as low as possible. An intact tool clamping device 1 therefore requires that the energy loss not exceed a predefined threshold value. An excessively high energy loss is a sign of excessively high friction due to material wear in one or more areas within the tool clamping device 1.

Another useful parameter for analyzing the energy loss is obtained by calculating the quotient of the energy loss and the work expended during the release cycle, with the work expended during the release cycle being defined by the area between the upper branch of the characteristic curve in FIG. 3 and the abscissa. This quotient specifies which portion of the overall work expended is converted into lost energy, i.e., heat. This value should change only minimally when the tool clamping device 1 is mounted and operated. If a higher deviation is observed, a reduced lifespan of the clamping system is to be expected. It should be noted that the energy loss also increases with the speed of the spring movement. Thus, it is possible to identify overload conditions which also shorten the lifespan of the tool clamping device 1.

Another status parameter of the tool clamping device 1 is based on the deviation of the shape of the spring characteristic curve from the shape shown in FIG. 3 which is marked by a substantial linearity of the two branches within a predefined stretch of the displacement. An example of a characteristic curve which markedly deviates from such a predominantly linear shape is shown in FIG. 4. Within the stretch of the displacement designated by $\Delta x$ in FIG. 4, both branches of the spring characteristic curve show significant increases in the force within a short stretch of the displacement. These increases indicate that the spring assembly 14 does not compress or expand uniformly, which can lead to a shortened lifespan of the clamping system. The cause of this may be that the load on the individual elements of the disk spring, which constitute the spring assembly 14, on the drawbar 5 is not uniform, which may occur when individual elements are jammed. Another possibility is that support sleeves, which are affixed, for example, in the center of the spring assembly to improve the balance of the assembly, are caught in the drawbar 5, which leads to the application of a one-sided load on the spring assembly 14.

Friction occurring between the spring elements and the drawbar 5 is manifested in the form of oscillations in the spring characteristic curve. These can be seen both during the release and clamping cycles. A suitable indicator for deviations from linearity is the standard deviation of the measured values from the linear shape given by a calculated spring constant. It should not exceed a defined threshold value if the spring assembly is intact. To ensure that this is the case, oil, grease, or suitable lubricants are used to ensure good slip behavior of the spring elements on the drawbar 5. If fluid enters or if individual spring elements are caught, the slip properties can deteriorate, which can lead to wear of the spring guide. Using the analysis described above, it is possible to check the slip properties of the spring elements on the drawbar 5 and thus the tribological status of the system of spring elements, spring guide and lubrication.

Figure 5:
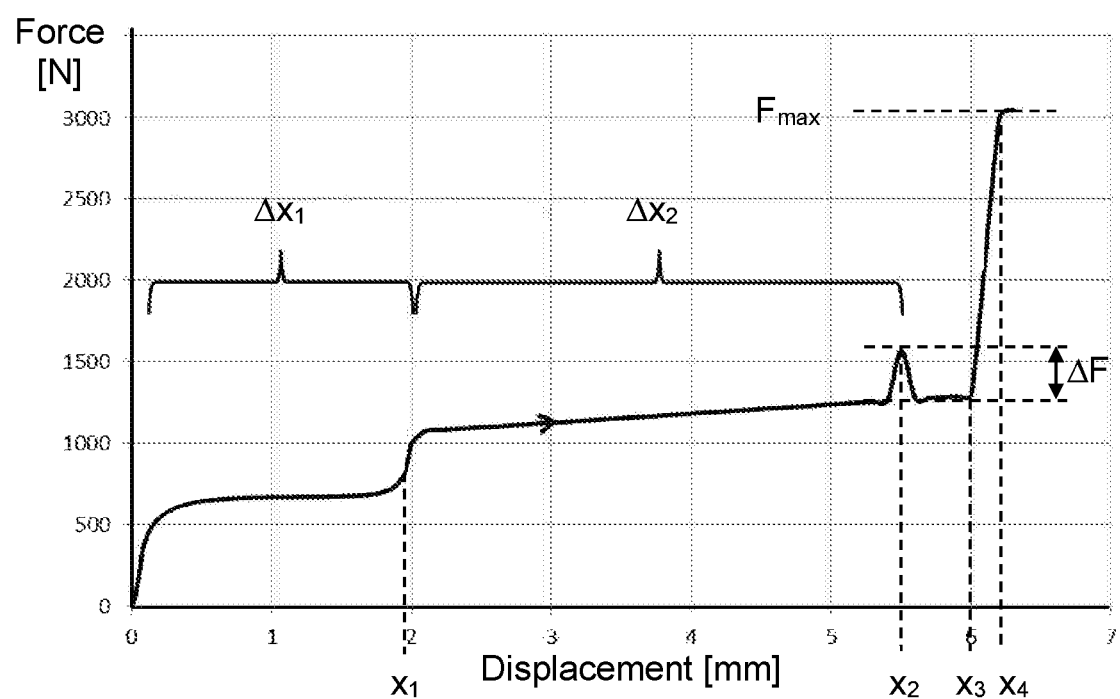

FIG. 5 shows an example of the branch of the spring characteristic curve of a tool clamping device 1 fully mounted on a machine spindle during the release cycle. The stretch between waypoints $x_1$ and $x_3$ correlates approximately with the upper branch of the characteristic curve in FIG. 3 in which the maximum at waypoint $x_2$, however, does not occur because the system has been measured on a test rig. The initial portion of the spring characteristic curve in FIG. 5, designated as $\Delta x_1$ to the left of point $x_1$ in FIG. 5, represents the area in which the plunger 18 moves forward as a result of the pressure in the posterior chamber 19, without its front end being in contact with the posterior face of the posterior part 17 of the drawbar 5.

With increasing length of the displacement, the force remains nearly constant since the spring assembly 14 is not yet being compressed.

At waypoint $x_1$, the front end of the plunger 18 comes into contact with the posterior face of the posterior part 17 of the drawbar 5, and from this point on, the compression of the spring assembly 14 begins, which is the reason why the force increases in an approximately linear line as the length of the displacement increases. At waypoint $x_2$, the force steeply increases by force $\Delta F$ to a relative maximum and subsequently drops just as steeply again. Thereafter, the previous approximately linear force response continues for a short distance before, beginning at waypoint $x_3$, the force steeply increases to a considerably higher value $F_{max}$ at waypoint $x_4$, which indicates the end of the release cycle.

The relative maximum of the force at waypoint $x_2$ is caused by the ejection of a clamped tool or tool holder. The reason is that in a clamping cycle, the cone of the tool holder is pulled by the spring force into the tool receiver (cone press fit). Because of the amount of pull-in force, the tool receiver is slightly deformed, and the tool holder would be caught in the receiver even without the force of the spring assembly 14. It is therefore necessary for this additional force to be overridden to make a release possible; this manifests itself in the spring characteristic curve by the transient increase $\Delta F$ in the force at waypoint $x_2$. If the tool is not ejected, the reason may be, e.g., a faulty tool holder which does not make contact with the clamping cone. In this case, the spring characteristic curve does not have a relative maximum at waypoint $x_2$. If the tool is not ejected because the release force exerted is not sufficiently high, only a final steep increase in the spring force to waypoint $x_4$ takes place; however, in this case again, the spring characteristic curve does not have the relative maximum at waypoint $x_2$.

When analyzing the spring characteristic curve of FIG. 5, one possibility of detecting whether the tool has been correctly ejected is to look, within a predefined area of the displacement near waypoint $x_2$ in which the ejection of the tool is to be expected, for a relative maximum of the spring characteristic curve, the height $\Delta F$ which is within a predefined range, i.e., between a minimum value and a maximum value. To ensure correct detection, it is also possible to use, as an additional criterion, the width of the region of the transient increase in force, based on the calculation of the turning points of the curve to the left and right of a relative maximum, and to compare this width with an expected width.

The presence of a relative maximum, which indicates that the tool has been correctly ejected, is another characteristic parameter which characterizes the status of the tool clamping device 1 and which can be seen in the spring characteristic curve. It is obvious that a high-priority error message should be sent to the machine control unit if an expected tool ejection was not detected so that the operation can be interrupted and the defect involved can be corrected in order to avoid faulty machining of the workpiece.

After the workpiece has been correctly ejected, the plunger 18 continues to push the drawbar 5 until said drawbar reaches a mechanical stop which in FIG. 5 is identified by a very steep increase in force between waypoints $x_3$ and $x_4$. At the end of the movement, i.e., at waypoint $x_4$ in FIG. 5, the maximum force $F_{max}$, which can be exerted by the hydraulic unit and the plunger 18, can be seen. Determining this maximum tool release force $F_{max}$, which is another characteristic parameter for the status of the tool clamping device 1, allows the pressure generated by the hydraulic unit to be adjusted, for example, from the standpoint of energy efficiency.

Based on the times recorded for each value of displacement and force, it is also possible to determine time-related parameters of a release and clamping cycle of the tool clamping device 1 from the time functions of these two characteristics. Such parameters are important in that the tool release time is a crucial feature of a tool clamping device 1. The following time intervals are of primary relevance:

The time between the reception of the signal for releasing the tool by the machine control unit and the beginning of application of force on the plunger 18 in the direction of the release position. The end of this time interval can be detected by means of the signal of the pressure sensor 21 on the posterior chamber 19.

The time between the beginning of application of force on the plunger 18 in the direction of the release position and the contact of the anterior end of the plunger 18 with the posterior part 17 of the drawbar 5. In FIG. 5, the displacement of the drawbar dedicated to this time interval is designated by $\Delta x_1$. The fact that contact has been made can be detected by a sudden increase in force, which in FIG. 5 can be seen at waypoint $x_1$.

The time between contact of the anterior end of the plunger 18 with the posterior part 17 of the drawbar 5 and the ejection of the tool. In FIG. 5, the displacement of the drawbar dedicated to this time interval is designated by $\Delta x_2$. The fact that contact has been made can be detected by a transient increase $\Delta F$ in force, which in FIG. 5 can be seen at waypoint $x_2$.

The characteristic time intervals mentioned above are additional characteristic parameters of the status of the tool clamping device 1. Determining these parameters makes it possible to compare and optimize technical variants. In addition, these parameters allow monitoring of pressure fluctuations and irregularities in the hydraulic system. During operation of the machine, the variance of the release times can be recorded and used for a dynamic tool changing program. As an alternative, the longest possible length of time for a tool change (worst case) can be used as a basis for calculations.

It should be emphasized that although the indirect measurement of force by means of a pressure measurement as disclosed in the practical example discussed is useful, it is by no means the only possibility available. As already mentioned, it would also be possible to measure the spring force by measuring the strain on a drawbar 5, for example, by accepting the increased labor and equipment costs involved in signal transmission. Further, it would also be possible to measure the deflection of the spring assembly 14 based on the position of the drawbar 5, using sensors other than those mentioned, for example, optical or radar-based sensors. In this context, it should also be mentioned that the numerical values for the force and displacement in FIGS. 3 to 5 are given only as examples.

The invention claimed is:

1. A method for monitoring a tool clamping device mounted on a machine spindle, wherein during operation, a spring assembly exerts a spring force, in a direction of a clamping position, on an actuating element actuating clamping or release of a tool or tool holder to generate clamping force of the tool clamping device, the method comprising:
continuously measuring and recording as a function of time the spring force and a displacement of the actuating element during release and/or clamping of the tool or tool holder;
determining a spring characteristic curve of the spring force as a function of displacement from the spring force and the displacement of the actuating element measured and recorded as functions of time; and
using the spring characteristic curve to determine at least one parameter indicating status of the tool clamping device.

2. The method of claim 1, wherein determining the at least one parameter is based on the spring force acting along a predefined displacement.

3. The method of claim 1, wherein the at least one parameter is a spring constant calculated based on the spring force as a function of the displacement within a predefined stretch of the displacement, or a correlation factor which is a measure of similarity between the spring force as a function of the displacement and a predefined function.

4. The method of claim 1, further comprising carrying out a full cycle of release and clamping and calculating the at least one parameter is lost energy converted into heat or a quotient of the lost energy converted into heat and total work expended.

5. The method of claim 1, wherein the at least one parameter is a measure of deviation of the spring force as a function of displacement from a linear curve within a first predefined stretch of displacement in which a deviation that is as low as possible from a linear curve is desired.

6. The method of claim 1, wherein in a release cycle, the at least one parameter is a deviation of the spring force as a function of displacement from a linear curve within a second predefined stretch of displacement in which a deviation of a predefined extent is a sign of a correct ejection of the tool or tool holder from the tool clamping device.

7. The method of claim 1, wherein the at least one parameter is at least one time interval between two points in time which are associated with predefined changes in a shape of the spring characteristic curve.

8. The method of claim 7, wherein the at least one time interval is a time between electronic triggering of a movement leading to release of the tool or tool holder and a beginning of this movement, a time between a beginning of a movement leading to release of the tool or tool holder and an application of force on the spring assembly and/or a time between an application of force on the spring assembly and ejection of the tool or tool holder.

9. The method of claim 1, wherein the at least one parameter is a maximum force occurring at an end of a release cycle which occurs when displacement of the actuating element is limited by a mechanical stop.

10. The method of claim 1, wherein in the event of a deviation of the at least one parameter from a reference value which exceeds a predefined threshold or indicates presence of a defect, a message is sent to an electronic control unit, which controls operation of the machine spindle and/or an optical and/or and acoustic warning signal for operating personnel is emitted by means of a display unit.

11. The method of claim 10, wherein the reference value is a fixed predetermined value or a value of the at least one parameter that was stored in a data storage unit of a monitoring device provided to implement the method, which value had been determined in a previous release and clamping cycle.

12. The method of claim 1, wherein values of a characteristic parameter determined are stored in a data storage unit of a monitoring device, and wherein based on the values stored, rates of change are calculated and used to predict future development of the characteristic parameter over time.

13. The method of claim 1, further comprising calculating the spring force indirectly, wherein the spring force is measured in that a hydraulic force—which counteracts the spring force and which is exerted on a plunger of a hydraulic release mechanism, which plunger, during a release operation, exerts a force on the actuating element in the direction of the release position from a pressure measurement of a hydraulic fluid and a surface area of the plunger.

14. The method of claim 13, further comprising calculating the hydraulic force, which counteracts the spring force, on the plunger, wherein on each axial side of the plunger, a pressure of the hydraulic fluid acting on the plunger is measured, then based on this pressure and the surface area of each respective side of the plunger, a force acting from this side on the plunger is calculated, and a difference between these two forces is the resulting hydraulic force on the plunger.

15. The method of claim 1, further comprising stopping operation of the machine spindle once a deviation of the at least one parameter from a reference value exceeds a predefined threshold.

16. The method of claim 1, wherein the continuously measuring and recording is carried out without interruption of operation of the machine spindle.

* * * * *